US012768685B2

(12) United States Patent
Wiedmann et al.

(10) Patent No.: US 12,768,685 B2
(45) Date of Patent: Oct. 20, 2026

(54) CLAMPING DEVICE, SENSOR MODULE AND SENSOR ASSEMBLY

(71) Applicant: Schunk SE & Co. KG Spanntechnik Greiftechnik Automatisierungstechnik, Lauffen am Neckar (DE)

(72) Inventors: Moritz Wiedmann, Lauffen/Neckar (DE); Daniel Schöttle, Botenheim (DE); Martin Kasemann, Lauffen/Neckar (DE); Robert Tannhäuser, Lauffen/Neckar (DE)

(73) Assignee: Schunk SE & Co. KG Spanntechnik Greiftechnik Automatisierungstechnik, Lauffen am Neckar (DE)

(*) Notice: Subject to any disclaimer, the term of this patent is extended or adjusted under 35 U.S.C. 154(b) by 276 days.

(21) Appl. No.: 18/695,484

(22) PCT Filed: Sep. 14, 2022

(86) PCT No.: PCT/EP2022/075541
§ 371 (c)(1),
(2) Date: Mar. 26, 2024

(87) PCT Pub. No.: WO2023/046552
PCT Pub. Date: Mar. 30, 2023

(65) Prior Publication Data

US 2024/0393146 A1 Nov. 28, 2024

(30) Foreign Application Priority Data

Sep. 27, 2021 (DE) ......................... 102021124907.4

(51) Int. Cl.
*G01D 11/24* (2006.01)
*B23B 31/117* (2006.01)
(Continued)

(52) U.S. Cl.
CPC ........ *G01D 11/245* (2013.01); *B23B 31/1179* (2013.01); *G08C 17/02* (2013.01); *H01Q 1/22* (2013.01)

(58) Field of Classification Search
CPC . B23B 31/1179; B23B 31/2073; B23Q 17/10; B23Q 17/0985; B23Q 17/0995;
(Continued)

(56) References Cited

U.S. PATENT DOCUMENTS

2006/0085092 A1* 4/2006 Redecker ............. B23Q 17/098
700/174
2019/0001456 A1* 1/2019 Kalhori .............. B23Q 17/0952
(Continued)

FOREIGN PATENT DOCUMENTS

DE 102006013935 A1 2/2008
DE 102015220533 A1 * 4/2017 ......... B23Q 11/1023
(Continued)

OTHER PUBLICATIONS

Machine Translation of DE102015220533, via espacenet.com, generated Feb. 19, 2026 (Year: 2015).*

*Primary Examiner* — Daniel J Wiley
(74) *Attorney, Agent, or Firm* — CALDERON SAFRAN & WRIGHT P.C.

(57) ABSTRACT

A clamping device for clamping a component includes a base body, at the front end region of which is arranged a clamping region, and a sensor module designed as a structural unit and including a tubular sensor housing, a closure cover, which firmly closes the sensor housing at one end face, a sensor element accommodated within the sensor housing for detecting operating parameters, and a data transmission device connected to the sensor element for the wireless transmission of measurement data recorded by the sensor element to a receiver located outside the clamping device. A receiving space for a sensor module is formed in
(Continued)

the base body, which is open to a peripheral surface of the base body and extends radially into the base body starting therefrom. The sensor module is inserted into the receiving space and held therein in such a way that the closure cover faces outwards.

20 Claims, 13 Drawing Sheets

(51) Int. Cl.
*G08C 17/02* (2006.01)
*H01Q 1/22* (2006.01)

(58) Field of Classification Search
CPC ............ B23Q 17/2457; B23Q 17/0952; B23Q 17/2442
See application file for complete search history.

(56) References Cited

U.S. PATENT DOCUMENTS

| | | | | |
|---|---|---|---|---|
| 2021/0114156 | A1* | 4/2021 | Bleicher | B23Q 11/127 |
| 2022/0410331 | A1* | 12/2022 | Kirn | B23Q 17/0952 |

FOREIGN PATENT DOCUMENTS

| | | | |
|---|---|---|---|
| DE | 102019130162 | A1 | 5/2021 |
| EP | 3808503 | A1 | 4/2021 |

* cited by examiner

CLAMPING DEVICE, SENSOR MODULE AND SENSOR ASSEMBLY

CROSS-REFERENCE TO RELATED APPLICATIONS AND CLAIM TO PRIORITY

This application is a national stage of International Application No. PCT/EP2022/075541 filed Sep. 14, 2022, which claims priority to German Patent Application No. 102021124907.4 filed Sep. 27, 2021, the disclosures of which are incorporated herein by reference and to which priority is claimed.

FIELD OF THE INVENTION

The present invention relates to a clamping device for clamping a component, in particular for fixing a tool on a machine tool, with a base body defining a clamping axis, at the front end region of which is arranged a clamping region for a component to be clamped, in particular for a tool shank. Furthermore, the present invention relates to a sensor module, in particular for such a clamping device, and to a sensor arrangement.

BACKGROUND OF THE INVENTION

Such clamping devices for fixing a tool in a machine tool, for example, are known in various designs and are used to fix a tool such as a milling or drilling tool for machining a workpiece on a work spindle of a machine tool. Such a clamping device usually comprises a base body that defines a clamping axis and, at a front end area, a clamping region in which the component to be clamped is held in a force-locking manner. The clamping device can be designed as a chuck, which means that the clamping area has a receptacle for a tool shank, for example. Alternatively, the clamping device can also be designed as a mandrel. In this case, the clamping area has a radially outward-facing clamping surface in order to fix a component from the inside in a force-locking manner.

Increasingly, such clamping devices are being equipped with sensors in order to be able to record various operating parameters during a machining process. For example, such a clamping device can have an acceleration sensor to detect vibrations during a machining process. Such vibrations can occur when a tool inserted into the clamping device for machining is worn.

A temperature sensor can also be provided in order to detect possible insufficient cooling of a tool used. Furthermore, suitable sensors can be used to determine deformations of the base body, from which conclusions can be drawn about the machining forces that occur. The data determined by such sensors can be sent to a central machine control system via a suitable transmission device so that the machining parameters can be adjusted if necessary.

One such clamping device, designed as a tool holder, is already known from DE 10 2015 220 533 A1. This is used to fix a tool to the work spindle of a machine tool and comprises a base body defining a clamping axis. A clamping area with a central receptacle for the shank of a tool to be clamped, which is open towards the front end face of the base body, is formed at the front end area of the base body. Sensors are arranged at various points in the base body. These in turn are connected via electrical cables to recesses open to the outside for accommodating a signal transmission device. Power supply devices, which are connected to the sensors via electrical lines, can be provided at other positions in the base body.

Even if such tool holders have proven themselves in principle, the fact that changing the sensors is time-consuming is seen as a disadvantage in some cases.

SUMMARY OF THE INVENTION

The task of the present invention is thus to provide an alternative clamping device for clamping a component, as well as a sensor module for such a clamping device, in which in particular the above-mentioned disadvantages are avoided.

This task is solved in a clamping device of the type mentioned at the beginning in that a receiving space for a sensor module is formed in the base body, which is open to a circumferential surface of the base body and extends radially from this into the base body starting therefrom. Furthermore, according to the invention, the clamping device comprises a sensor module which is designed as a structural unit and comprises a tubular sensor housing which defines a sensor axis, a closure cover which firmly closes the sensor housing at one end face, a sensor element accommodated inside the sensor housing for detecting operating parameters and a data transmission device connected to the sensor element for wireless transmission of measurement data detected by the sensor element to a receiver located outside the clamping device, the sensor module being inserted into the receiving space and held therein in such a way that the closure cover faces outwards.

Furthermore, the problem underlying the invention is solved by a sensor module for such a clamping device, wherein the sensor module is designed as a structural unit and has a tubular sensor housing which defines a sensor axis, a closure cover which firmly closes the sensor housing at one end face, a sensor element accommodated inside the sensor housing for recording measurement data and a data transmission device connected to the sensor element for wireless transmission of measurement data recorded by the sensor element to a receiver located outside the clamping device.

The invention is based on the fundamental idea of providing a sensor module designed as a structural unit, which is inserted into a holding space of a clamping device, with a cover that is open to the outside. This allows the cover to be fitted with functional components that should be accessible from the outside. At the same time, other components such as a sensor element or a power supply unit can be accommodated in a protected manner inside the holding space. In addition, such a sensor module can be replaced quickly and easily as a unit without the need for time-consuming disassembly of individual sensors.

Specifically, the sensor element can comprise a temperature sensor and/or a motion sensor, in particular a sensor for detecting the speed of the clamping device and/or a pressure sensor and/or a deformation sensor and/or an acceleration sensor. In principle, the sensor element can comprise one or more sensors. For example, the cutting speed can be determined indirectly via a speed sensor if the clamping device according to the invention is used to fix a tool on a machine tool. Furthermore, a sensor element containing an acceleration sensor can detect vibrations that occur. A temperature sensor makes it possible to detect excessively high temperatures of the base body. In particular, if the sensor element is located near coolant lines, the coolant temperature can be detected relatively accurately using a temperature sensor.

According to a preferred embodiment of the invention, the data transmission device is integrated into the closure cover. Because the data transmission device is directly accessible from the outside, there is only a weak attenuation of the transmitted signals, so that measurement data can be easily transmitted to a receiver located outside the clamping device. Wireless transmission considerably minimizes the susceptibility to interference compared to contact transmission, which can take place via sliding contacts, for example. In particular, the data can be transmitted to a machine control system, enabling important operating parameters to be controlled. For example, if the sensor element detects that vibrations are occurring due to the wear of a tool inserted in the clamping device, the operating parameters, such as the rotational speed and/or the feed rate, can be adjusted in order to still ensure high-quality workpiece machining. The data transmission device is particularly suitable for use in a wireless network and/or for connection to the Internet.

The data transmission device can comprise an antenna with an earth pole and an antenna pole, which is cast into the closure cover in particular. The closure cover can essentially be made of plastic, as a result of which the signals emitted by the antenna are only weakly attenuated. The antenna is used to emit electromagnetic waves for the wireless transmission of signals. For this purpose, a varying electrical voltage is applied between the earth pole and the antenna pole.

In a further embodiment, the earth pole can be electrically connected or connectable to the sensor housing. This embodiment is based on the idea that the sensor housing and, in particular, the base body of the clamping device are held at a ground potential and the antenna pole is subjected to a potential that varies relative to it in order to emit signals. It is also conceivable that there is no electrically conductive connection between the earth pole and the antenna pole, particularly if required. Preferably, the earth pole for the frequency range used to transmit measurement data is connected to the sensor housing in an electrically conductive manner.

In a specific embodiment, the earth pole and the antenna pole can be disc-shaped, in particular with a circular outer shape in the closure cover, with the two poles extending in particular parallel to each other, preferably perpendicular to the sensor axis. In other words, two metallic disks can be formed in the closure cover at a distance from each other in the direction of the sensor axis, which form the earth pole and the antenna pole. Such a disk-shaped design allows signals to be emitted to the outside.

In a further embodiment of this embodiment, the antenna pole can be arranged adjacent to the outward-facing end face of the closure cover and the ground pole can be located on the inside of the sealing cap with respect to the antenna pole, in particular in the area of an annular outer collar of the closure cover. An arrangement of the antenna pole in the vicinity of the outward-facing end face of the closure cover enables good transmission of signals, as only a small thickness of material remains between the antenna pole and the surroundings, so that only a low attenuation of the signals occurs. In contrast, the earth pole is preferably located in an inner end section of the closure cover.

In order to be able to emit corresponding signals, the antenna pole is preferably connected to an electrical conductor that leads from the antenna pole into the interior of the sensor housing, in particular to a circuit board. Accordingly, the ground terminal is provided with a through-opening through which the electrical conductor runs electrically insulated from the ground terminal. This design is based on the necessity that the corresponding signal, i.e. the corresponding voltage, is generated inside the sensor housing, for example on a circuit board, and the antenna pole must be connected to this in an electrically conductive manner. Accordingly, it is provided that the earth terminal has a through-hole through which such an electrical conductor can be routed to the antenna terminal.

In a further embodiment, the antenna pole and/or the earth pole can have honeycomb-shaped openings which are filled with material, in particular with a plastic. In the clamping device according to the invention, the closure cover and thus the antenna pole and the earth pole are arranged outside the clamping axis, so that considerable centrifugal forces act. In order to increase the strength of the two components in the sealing cap, honeycomb-shaped openings are provided accordingly, which are filled with material. In particular, the closure cover can be manufactured by casting the antenna pole and the earth pole. In this case, the openings are filled with material so that the poles are firmly anchored in the closure cover and resistance to centrifugal forces is achieved.

In a further embodiment, the clamping device can also comprise a power supply unit to supply the sensor module with power. The power supply unit is preferably housed as a separate component in the holding space. Specifically, the energy supply unit can be arranged at the inner end of the receiving space so that it is held in the receiving space by the sensor module. A shim can be provided between the energy supply unit and the sensor module in order to position the sensor element on the clamping axis.

This design is based on the idea of providing a power supply unit directly adjacent to the sensor module. In particular, this can be a battery cell, preferably a rechargeable battery cell. Such battery cells can be designed as lithium-ion batteries, for example. Such an energy source is required to supply a sensor element with electrical energy independently of a machine tool or other external energy supplies. The use of a rechargeable battery cell has the advantage that it does not have to be replaced, but can be recharged repeatedly, especially when the clamping device is not in use. A shim can be used to ensure that the sensor element lies exactly on the clamping axis.

For charging the energy supply unit, the sensor module can have two externally accessible electrical charging contacts, which are each electrically connected or connectable to corresponding contacts on the energy supply unit and are electrically insulated from one another in order to be able to supply the energy supply unit with voltage and/or current and charge it by contacting the two electrical charging contacts with the poles of a charger. In other words, it is intended to provide corresponding contacts in an externally accessible area of the sensor module so that the energy supply unit can be charged by a charger from outside via the sensor module without the sensor module having to be dismantled and/or the energy supply unit having to be removed from the receiving space.

In a specific embodiment, a first electrical charging contact, in particular for applying a negative pole of a charger, can be arranged in the closure cover, preferably in the center of the closure cover, and a second electrical charging contact, in particular for applying a positive pole of a charger, is formed by the externally accessible end face of the sensor housing. In other words, an electrical charging contact on the closure cover is electrically insulated from the sensor housing so that one pole of a charger can be applied to the closure cover and another pole can be applied to the outside of the front end face of the sensor housing in relation to the sensor axis. The two charging contacts can be arranged axially offset to each other in relation to the sensor axis. In particular, the charging contact arranged on the sealing cap can protrude from the front face of the sensor housing.

The first electrical charging contact can be electrically conductively connected to the antenna pole, in particular formed by a contact region formed on the antenna pole which is open to the outside. In other words, it may be provided that the antenna pole itself simultaneously forms the first electrical charging contact. Specifically, this can extend over a partial area of the antenna pole, which is formed in particular in the center of the antenna pole. A corresponding elevation can be formed in this, which is open to the outside, i.e. is not covered by the electrically insulating material of the sealing cap. Similarly, a coating, e.g. an electrically insulating layer, can be dispensed with in the area of the first electrical charging contact, so that the antenna pole is directly accessible from the outside.

Preferably, the sensor housing is connected to a corresponding electrical contact on the power supply unit and the cover is connected to another electrical contact on the power supply unit. For example, the energy supply unit can be disk-shaped and have an outer contact ring on an end face facing the sensor module, which is in contact with the sensor housing directly or via the shim, and an inner, in particular circular contact surface, which is electrically conductively connected to the charging contact of the closure cover. Accordingly, the sensor module according to the invention is characterized in that the data transmission device is integrated into the closure cover and/or in that the sensor module has two externally accessible electrical charging contacts, each of which can be electrically connected to corresponding contacts of a power supply unit and are electrically insulated from one another, in order to be able to supply the energy supply units with voltage and/or current and charge them by contacting the electrical charging contacts with a charger, a first electrical charging contact being preferably arranged in the closure lid, preferably centrally in the closure lid, in particular for applying a negative pole of a charger, and a second electrical charging contact, in particular for applying a positive pole of a charger, being formed by the end face of the sensor housing on the closure cover side.

According to a preferred embodiment of the clamping device according to the invention, it is provided that the receiving space intersects the clamping axis, but does not completely penetrate the base body radially. In other words, starting from a radial circumferential surface, the receiving space extends beyond the clamping axis and ends in a radial area of the base body opposite the open end. The receiving space can have a circular cross-section and in particular be stepped, i.e. have areas with different diameters.

Preferably, the sensor element is arranged within the sensor housing in such a way that it lies on the clamping axis or can be placed on the clamping axis of a clamping device. This design is based on the consideration that no centrifugal force acts on such a sensor element arranged centrally to the clamping axis, which improves the functionality and/or service life of the sensor element.

In a further embodiment, the sensor module can have a circuit board that is arranged inside the sensor housing and carries the sensor element, with the circuit board preferably running parallel to the sensor axis and containing data processing means for processing the measurement signals provided by the sensor element. A circuit board with electronic components has the advantage that it is easy to prefabricate and can therefore be easily installed in a sensor housing. The data processing means can, for example, be designed in such a way that measurement signals provided by the sensor element are processed and made available to the data transmission unit in a processed form. For example, a temperature sensor, which is designed as a thermocouple, can provide a low voltage as a measurement signal, which is then converted into a transmittable signal by the data processing means.

The base body can have at least one coolant channel to conduct coolant from a rear machine interface of the base body to the front to the clamping region. At least one coolant channel, which is preferably designed as a central axial through-hole, can intersect the receiving space so that the receiving space divides the coolant channel into a front channel section and a rear channel section. Accordingly, an annular coolant groove can be formed in the outer circumferential surface of the sensor housing so that coolant, which is directed to the clamping area, can flow past the sensor housing from the rear channel section to the front channel section through the coolant groove. This design is based on the consideration that, in the case of a coolant channel that is arranged centrally in particular, the receiving space passes through it and therefore an inserted sensor element generally impedes the flow of coolant. Accordingly, a coolant groove is provided in the outer wall of the sensor housing, through which the coolant can flow past the sensor housing. Preferably, the width of the coolant groove is matched to the diameter or the flow cross-section of the at least one coolant channel in order to allow an undisturbed flow. In particular, the width of the coolant groove can correspond to the diameter of the coolant channel in question.

Appropriate sealing means can be provided to seal the gap between the sensor housing and the wall of the receiving chamber on both sides of the coolant groove. Specifically, an annular circumferential sealing groove can be formed in the sensor housing on both sides of the coolant groove, into which sealing rings are or can be inserted and pressed against the wall of the receiving chamber. This prevents coolant from escaping through the gap between the sensor housing and the wall of the receiving chamber.

In a preferred embodiment, the sensor module is screwed into the base body, whereby in particular an external thread is formed on the sensor housing, which is screwed into a corresponding internal thread of the receiving space.

In order to be able to screw the sensor module into the receiving space in a simple manner, corresponding engagement means can be designed for a tool. These can comprise several, in particular three, recesses distributed around the circumference and open outwards towards the closed end face and radially to the sensor axis, which preferably extend into the external thread. Accordingly, a tool can have corresponding projections that are engaged in the recesses so that a rotary movement of the tool can be transmitted to the sensor module. If there are three recesses distributed around the circumference, the tool is simultaneously centered relative to the sensor module.

In a further embodiment, a radially inwardly projecting annular collar can be provided on the closed end section of the sensor housing, which engages behind a corresponding annularly circumferential outer collar of the closure cover, so that the sealing cap is held positively on the sensor housing. For sealing purposes, the closure cover can also be glued, soldered, welded or pressed to the sensor housing, either additionally or alternatively.

In a further embodiment, the base body of the clamping device according to the invention can have a machine interface with a fastening cone and a ring flange in its rear axial end area. Such machine interfaces are designed, for example, as hollow shank cones (HSK) and are standardized in accordance with DIN 69893-1. Alternatively, the base body can also comprise a steep taper (SK) in accordance with DIN 2080 as a machine interface.

Preferably, the receiving space for a sensor element is arranged in a section of the base body located axially in front of the machine interface. This creates easy accessibility for a possible receiving device for the signals transmitted by the data transmission device.

The clamping device according to the invention can be designed as a heat shrink chuck. In this case, the clamping area contains a receptacle, usually in the form of a bore, the diameter of which is slightly smaller than the outer diameter of a component to be clamped. If the component is to be inserted into the receptacle, the base body is heated so that the diameter of the receptacle increases as a result of thermal expansion. The component can then be inserted into the holder with play before it is clamped in a force-fit when the base body cools down. Such heat shrink chucks are subject to wear when components are repeatedly clamped, which can lead to vibrations. In this case, a sensor element can be used, for example, to detect these vibrations and thus the wear at an early stage, thereby enabling either the clamping device to be replaced in good time or the operating parameters to be corrected.

Alternatively, the clamping device can be designed as a hydraulic chuck, whereby a receptacle for a component is surrounded in an annular shape by a pressure chamber that can be pressurized with a hydraulic medium, whereby a thin wall is provided between the receptacle and the pressure chamber, which can be elastically deformed inwards by increasing the pressure in the pressure chamber in order to non-positively fix a tool shank inserted into the receptacle. In a hydraulic chuck of this type, the receptacle is usually also designed as a bore. The diameter of the bore is slightly larger than the diameter of the component to be clamped so that it can be inserted into the locating bore without any problems. For clamping, the hydraulic medium in the pressure chamber is pressurized by suitable clamping means so that the wall of the locating bore is deformed radially inwards and the component inserted into the locating bore is fixed in a force-locking manner.

The problem underlying the invention is further solved by a sensor arrangement for attachment to a component, in particular to a tool holder or to a tool, preferably to a torsion bar, having a base body which has fastening means for attachment to a component and in which a receiving space is formed for a sensor module which is open to an outside of the base body, and a sensor module according to the invention which is inserted, in particular screwed, into the receiving space.

This design is based on the idea of subsequently attaching such a sensor arrangement to a component in order to be able to detect vibrations that occur, for example. Accordingly, the base body is provided with fastening means so that it can be attached to a component. Such a sensor arrangement is particularly suitable for attaching to stationary and/or non-rotating tools such as lathe tools or lathe tool holders. In the event of increased tool wear, vibrations can occur during machining, which can be detected by the sensor module screwed into the mounting space. The recorded data can be transmitted to an external receiver, which is connected to the machine control system for example, using the data transmission device so that the machining parameters can be adjusted accordingly.

In a further embodiment of the sensor arrangement according to the invention, this can further comprise a power supply unit in order to supply the sensor module with power, the power supply unit being accommodated in particular in the receiving space, preferably arranged at an inner end of the receiving space.

The fastening means can include a mounting opening for placing on a component. For example, the mounting opening can have a circular cross-section so that the base body can be pushed onto a lathe tool holder with a corresponding cross-section. The fastening means can also be designed in such a way that the base body can be fixed to a component. For this purpose, corresponding threaded holes can be provided, which open into the mounting opening, for example to allow the base body to be fixed to a component by means of several clamping screws.

BRIEF DESCRIPTION OF THE DRAWINGS

With regard to further advantageous embodiments of the invention, reference is made to the subclaims and to the following description of an embodiment with reference to the accompanying drawing. The drawing shows FIG. 1 a perspective view of a clamping device according to the present invention;

FIG. 3 the clamping device from FIG. 1 in a partial longitudinal sectional view with field lines drawn in;

FIG. 5 the illustration from FIG. 4 with the field lines drawn in;

DETAILED DESCRIPTION OF THE PREFERRED EMBODIMENT(S)

Figure 1:
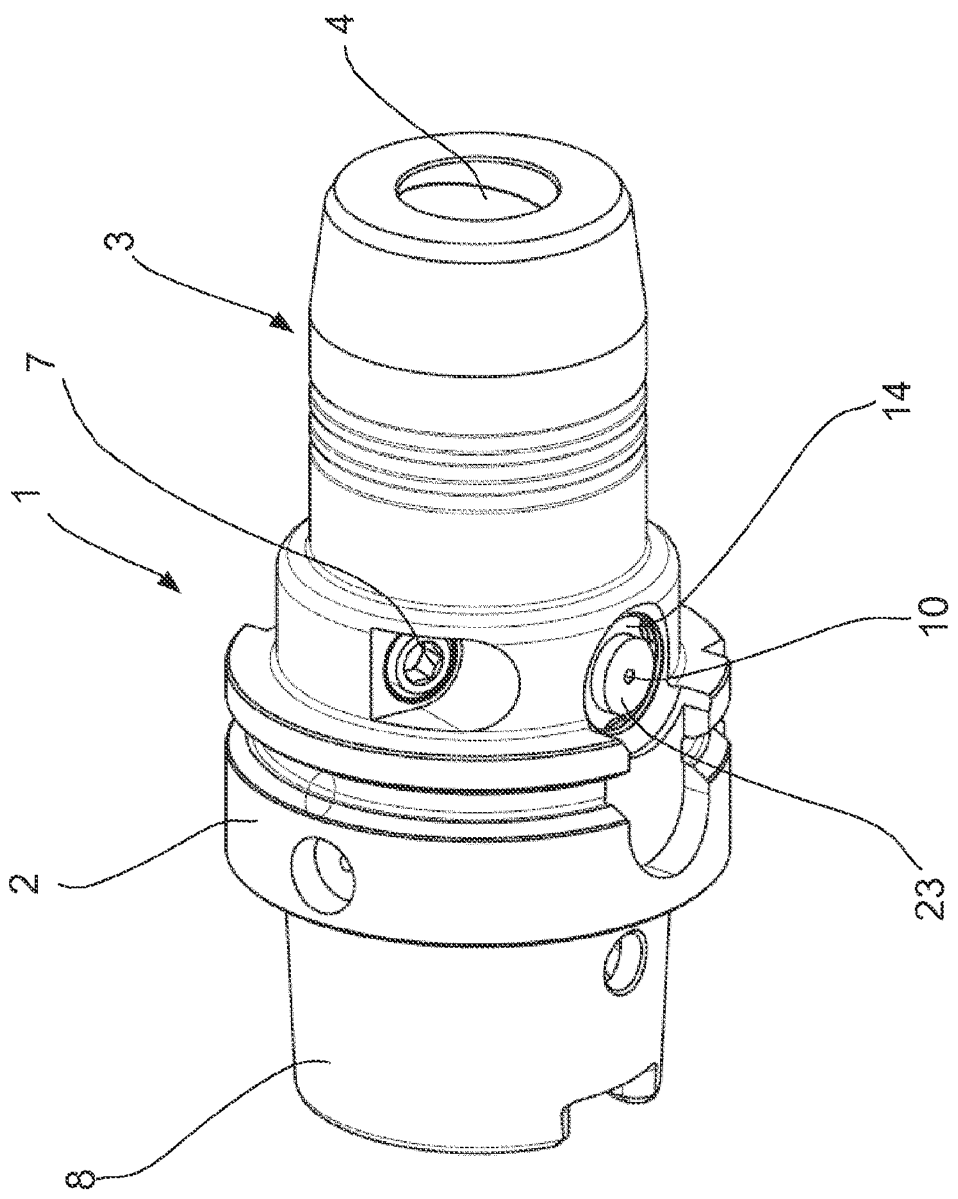

FIGS. 1 to 5 show a clamping device 1 designed as a chuck for fixing a tool on a machine tool according to the present invention. This comprises a base body 2 defining a clamping axis X, at the front end region of which a clamping region 3 for a tool shank is arranged. This comprises a receptacle 4 into which a tool shank of a tool to be clamped can be inserted.

In the present case, the clamping device 1 is designed as a hydraulic chuck. This means that the receptacle 4 is slightly larger than the tool shank to be clamped so that it can be inserted into the receptacle 4 with play. A thin wall 5 separates the receptacle 4 from an annular pressure chamber 6 filled with a hydraulic medium. By increasing the pressure in the pressure chamber 6, the thin wall 5 can be deformed radially inwards in order to fix a tool shank inserted in the receptacle 4 in a force-locking manner. Specifically, a clamping screw 7 is provided for this purpose, which can be moved in a hydraulic fluid supply channel (not shown) in order to increase or decrease the pressure in the pressure chamber 6.

At its rear end, the base body 2 has a machine interface 8, which is designed as a hollow shank taper (HSK) in accordance with DIN 69893.

The base body 2 also has a receiving space 9 for receiving a sensor module 10. In FIGS. 1 to 5, a sensor module 10 is inserted into the receiving space 9. In FIG. 6, the receiving space 9 is shown in detail without the sensor module inserted. The receiving space 9 is open to a circumferential surface of the base body 2 and extends radially therefrom into the base body 2. The receiving space 9, which has a circular cross-section, intersects the clamping axis X, but does not pass radially through the base body 2 completely.

A coolant channel 11 is also formed in the base body 2 in order to conduct coolant from the rear machine interface 8 to the front of the clamping area 3. The coolant channel 11 is arranged coaxially to the clamping axis X, so that the receiving space 9 intersects the coolant channel 11 and divides it into a front channel section 12 and a rear channel section 13.

Figure 7:
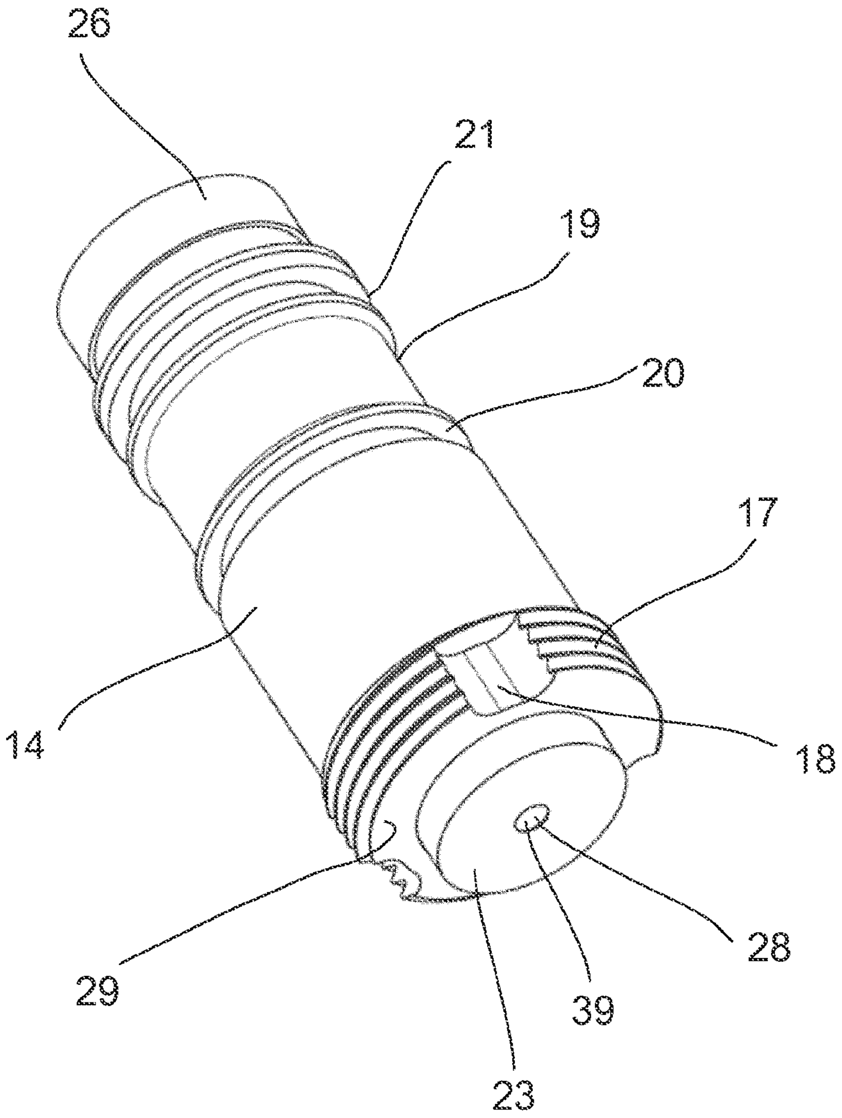
FIG. 7 a perspective view of a sensor module according to the present invention.
Figure 8:
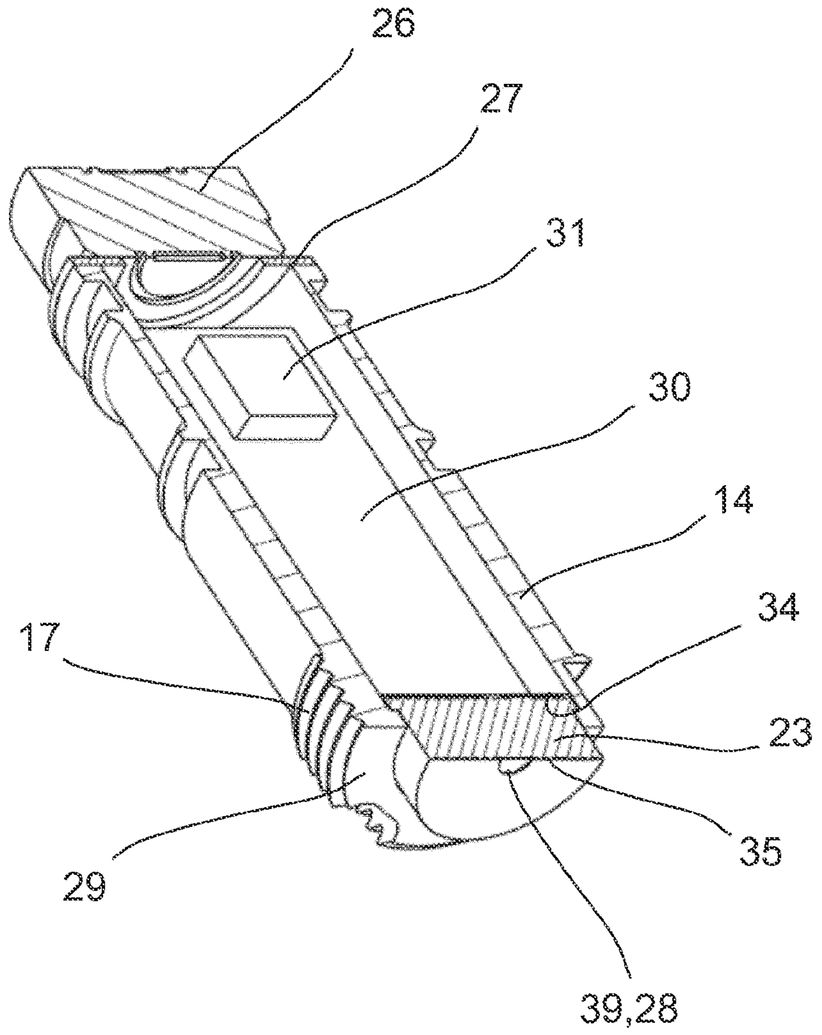
FIG. 8 a perspective longitudinal sectional view of the sensor module from FIG. 7.
Figure 9:
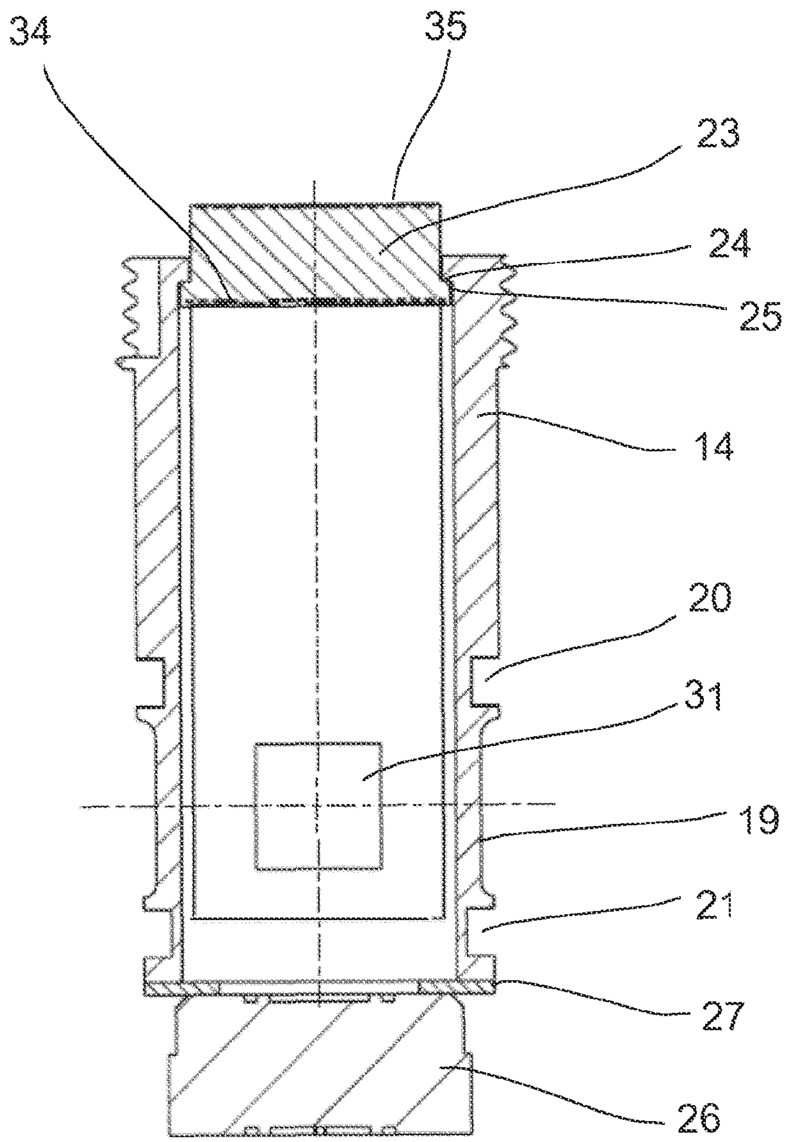
FIG. 9 a longitudinal sectional view of the sensor module from FIG. 7.

The sensor module 10, which is designed as a single unit and is shown separately in FIGS. 7 to 9, comprises a tubular sensor housing 14, which defines a sensor axis Y. The sensor module 10 is screwed into the receiving space 9 of the base body 2 with the sensor housing 14. For this purpose, an internal thread 15 is formed in the outwardly open end area of the receiving space 9, which opens radially on the inside into a recess 16. Accordingly, a corresponding external thread 17 is provided in the sensor housing 14. The two threads 15, 17 are designed as metric fine threads.

In order to be able to screw the sensor module 10 into the receiving space 9, engagement means for a tool are formed on the sensor housing 14. In the present case, these comprise three recesses 18 distributed around the circumference and open outwards towards the front and radially to the sensor axis, which extend into the external thread.

Since the diameter of the receiving space 9 is larger than the diameter of the coolant channel 11, an annular coolant groove 19 is formed in the outer circumferential surface of the sensor housing 14. The width of the coolant groove 19 essentially corresponds to the diameter of the coolant channel 11. This allows coolant, which is directed to the clamping area 3, to flow from the rear channel section 13 through the coolant groove 19 past the sensor housing 14 into the front channel section 12.

In order to seal the gap between the sensor housing 14 of the sensor module 10 and the wall of the receiving chamber 9, an annular circumferential sealing groove 20, 21 is formed on both sides of the coolant groove 19. As can be seen in particular in FIG. 3, sealing rings 22 are inserted into these sealing grooves, which are pressed against the wall of the receiving chamber 9.

The receiving space 9 is stepped so as not to damage the sealing rings 22 when the sensor module 10 is inserted into the receiving space 9. This means that the area of the receiving space 9 extending from the coolant channel 11 to the open end, which is shown above the clamping axis X in FIG. 4, has a slightly larger diameter than the area which extends from the coolant channel 11 to the closed end and is arranged below the clamping axis X in FIG. 4. Accordingly, the diameter of the groove base of the sealing groove 20 is also slightly larger than the diameter of the groove base of the sealing groove 21.

Figure 2:
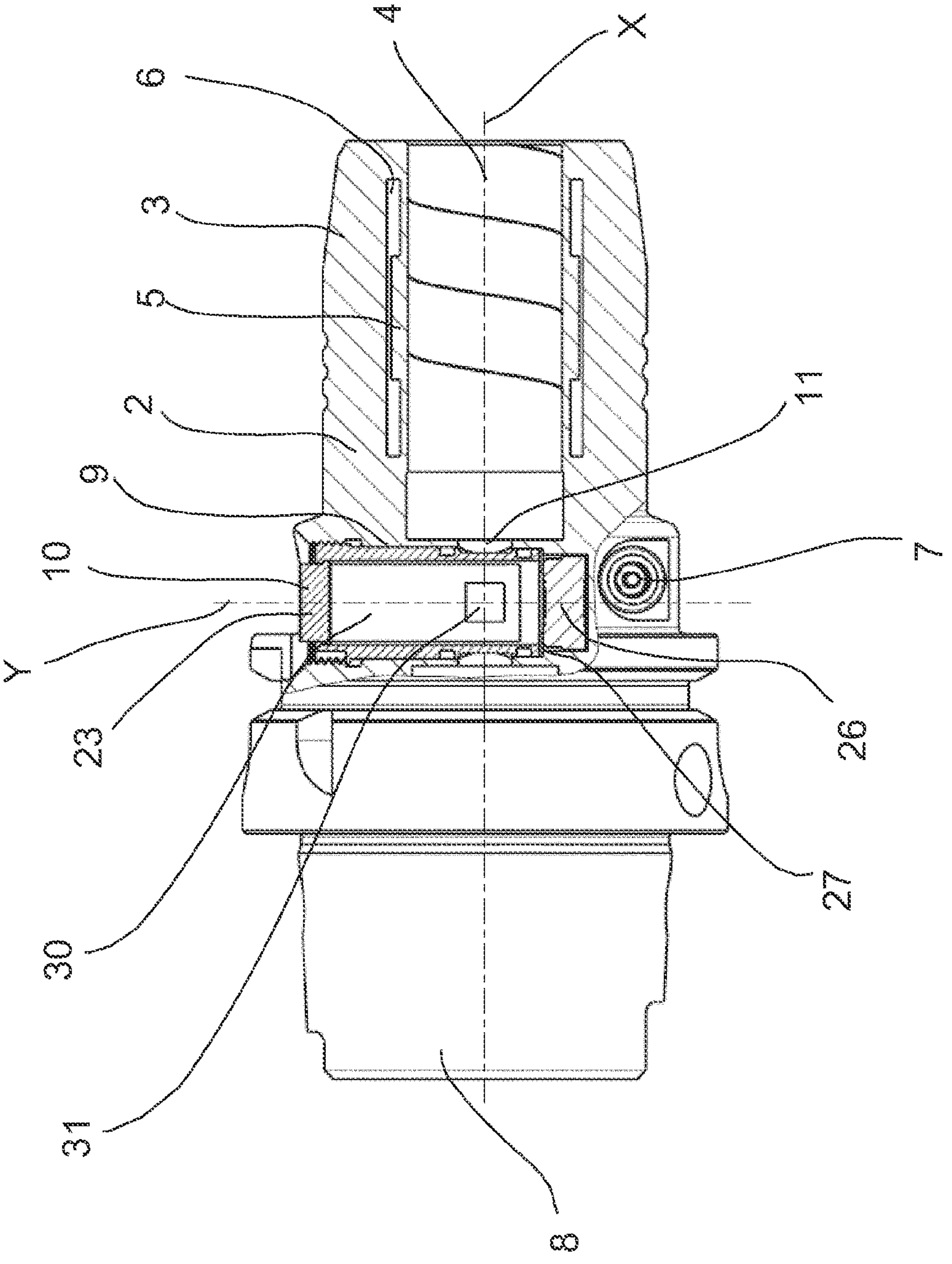
FIG. 2 a partial longitudinal sectional view of the clamping device from FIG. 1.

The sensor module 10 also comprises a cover 23, which firmly closes the sensor housing 14 at one end. FIG. 2 shows that the cover 23 faces the outwardly open end of the housing 9. Specifically, a radially inwardly projecting annular collar 24 is provided on the closed end area of the sensor housing 14, which engages behind a corresponding annularly circumferential outer collar 25 of the closure cover 23. In this way, the closure cover 23 is held positively on the sensor housing 14.

Furthermore, the clamping device 1 comprises a power supply unit 26 to supply the sensor module 10 with power. In the present case, the energy supply unit 26, which is designed as a rechargeable battery, is housed as a separate component in the holding space. Specifically, the energy supply unit 26 is located at the inner end of the receiving space 9. A shim 27 is arranged between the energy supply unit 26 and the sensor housing 14.

In order to be able to charge the energy supply unit 26, the sensor module 10 has two externally accessible electrical charging contacts. A first electrical charging contact 28, in particular for applying a negative pole of a charger, is arranged in the closure cover 23, in this case in the center of the closure cover 23. A second electrical charging contact 29, in particular for applying a positive pole of a charger, is formed by the externally accessible annular end face of the sensor housing 14. This means that a potential difference can be applied between the sensor housing 14 and the first charging contact 28 arranged in the closure cover 23. The second charging contact 29 is electrically connected to a corresponding contact on the power supply unit 26 via the sensor housing 14 and the shim 27. In addition, there is an electrical connection between the first charging contact 28, which is arranged in the closure cover 24, and a corresponding contact of the energy supply unit 26. In this way, the energy supply unit 26 can be supplied with voltage and/or current from the outside.

The sensor module 10 also has a circuit board 30, which is arranged inside the sensor housing 14 and runs parallel to the sensor axis Y. The circuit board 30 carries a sensor element 31 for detecting operating parameters. The sensor element 31 can comprise one or more sensors, for example an acceleration sensor to detect vibrations that occur, and/or a temperature sensor and/or a motion sensor and/or a pressure sensor and/or a deformation sensor. In order to counteract influences caused by centrifugal forces, the sensor element 31 is arranged within the sensor housing 14 by selecting a suitable shim 27 in such a way that it lies on the clamping axis X or can be positioned.

The circuit board 30 also contains data processing means for processing the measurement signals provided by the sensor element 31 and is in turn connected to a data transmission device 32 for wireless transmission of measurement data recorded by the sensor element 31 to a receiver located outside the clamping device 1. In the present case, the data transmission device 32 is integrated into the closure cover 23, so that transmission to the outside is largely interference-free.

Specifically, the data transmission device 32 comprises an antenna 33 molded into the closure cover 23, which has a disk-shaped ground pole 34, which is located in the area of the annularly encircling outer collar 25 and is electrically conductively connected to the sensor housing 14, and a disk-shaped antenna pole 35, which is arranged adjacent to the outwardly facing end face of the closure cover 23. The ground pole 34 and the antenna pole 35 are each shown as dashed lines in the sectional views. As can be seen in particular in FIG. 10, the diameter of the disc-shaped grounding pole 34 is slightly larger than the diameter of the closure cover 23 at its outer end and thus also larger than the diameter of the antenna pole 35. It is preferably provided that the diameter of the grounding pole 34 is at least 80% of the diameter of the outer end region of the sealing cap, in particular at least 90%, particularly preferably at least 95%.

Both the antenna pole 35 and the earth pole 34 have a large number of honeycomb-shaped openings 36, which are filled with the plastic of which the closure cover 23 is essentially made. In this way, the earth pole 34 and the antenna pole 35 are anchored in the closure cover 23 in a particularly favorable manner, so that they can also withstand high mechanical loads due to centrifugal forces.

Figure 11:
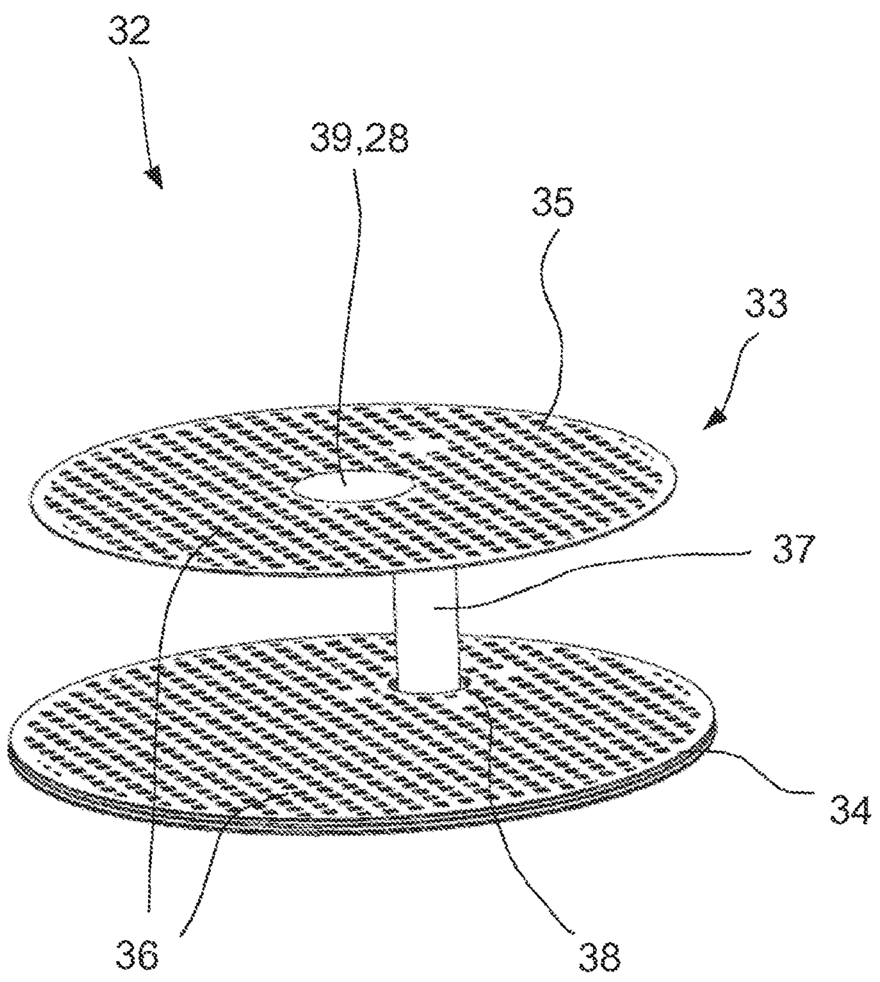
FIG. 11 a perspective view of the antenna of the sensor module from FIG. 7.

In order to apply a potential to the antenna pole 35, the antenna pole 35 is connected to an electrical conductor 37 which, as can be seen in FIG. 11, extends from the antenna pole 35 into the interior of the sensor housing 14 to the circuit board 30. Accordingly, the earth pole 34 has a through-opening 38 through which the electrical conductor 37 runs in the direction of the circuit board 30, electrically insulated from the earth pole 34.

A contact region 39 is formed in the center of the antenna pole 35, which is accessible from the outside, i.e. is not covered with plastic, and forms the first electrical charging contact 28.

During operation, the sensor element 31 continuously provides measurement signals. These are processed by the data processing means on the circuit board 30 and transmitted via the data transmission device 32, which is designed as an antenna 33, continuously or at specific intervals to a receiver located outside the clamping device 1, which is connected to the control system of a machine tool, for example.

Figure 3:
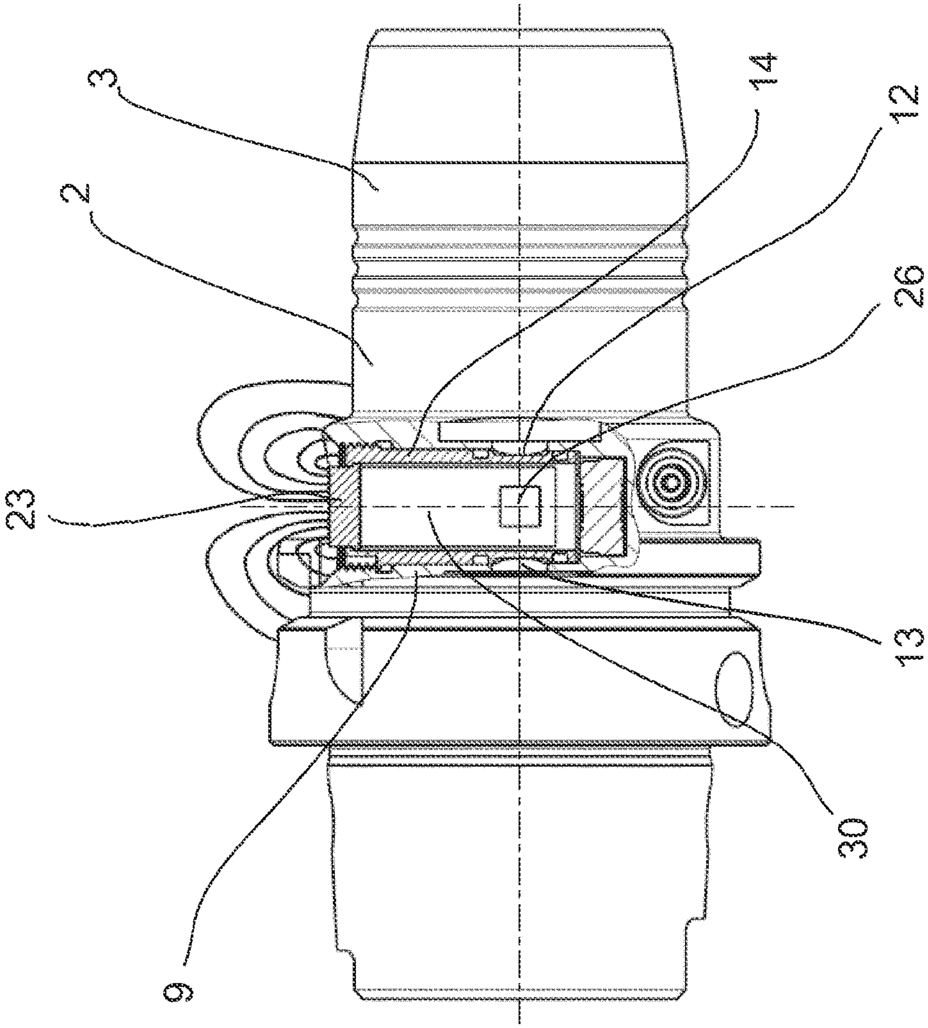
Figure 4:
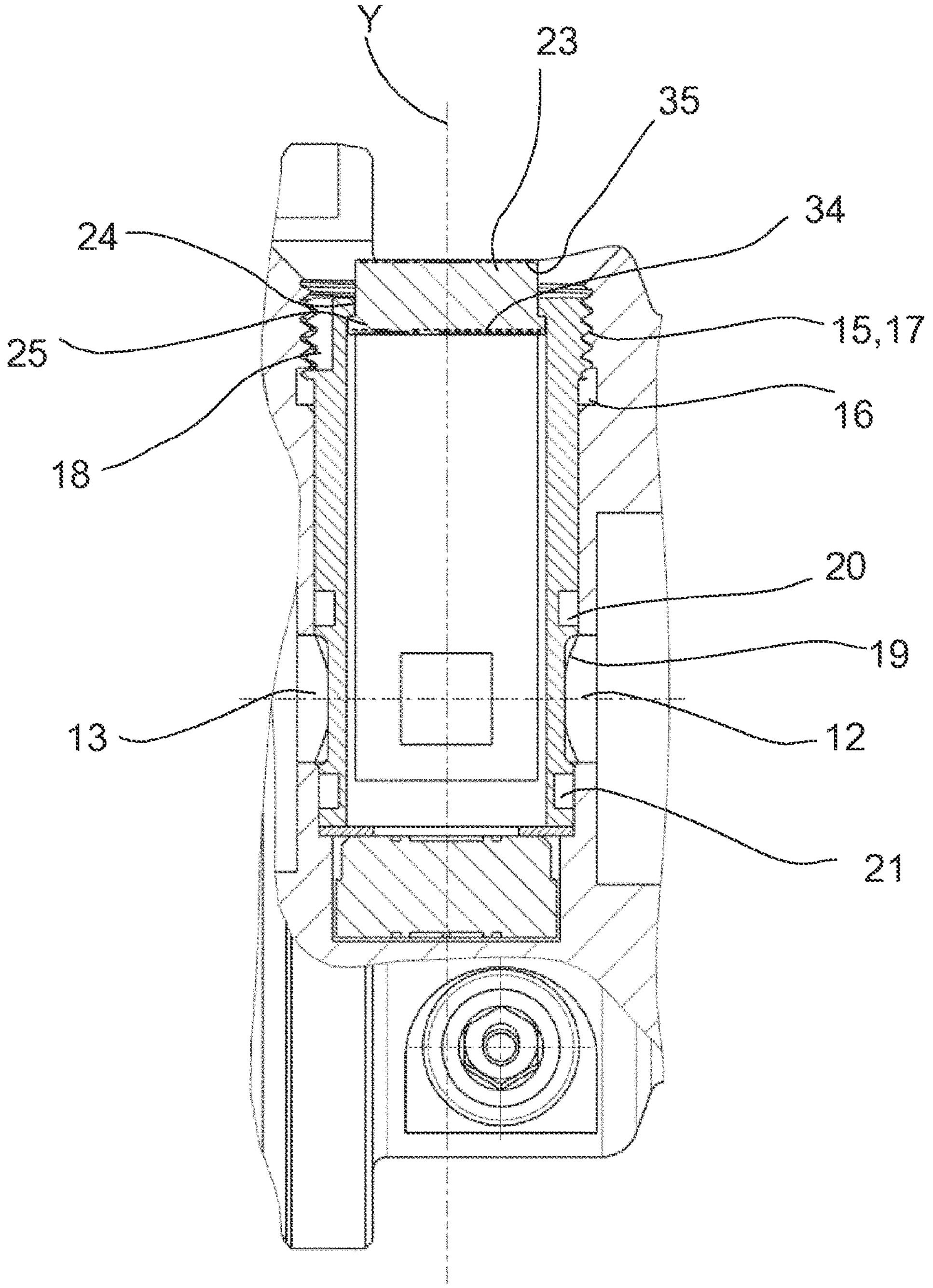
FIG. 4 the clamping device from FIG. 1 in a further detailed longitudinal sectional view.
Figure 5:
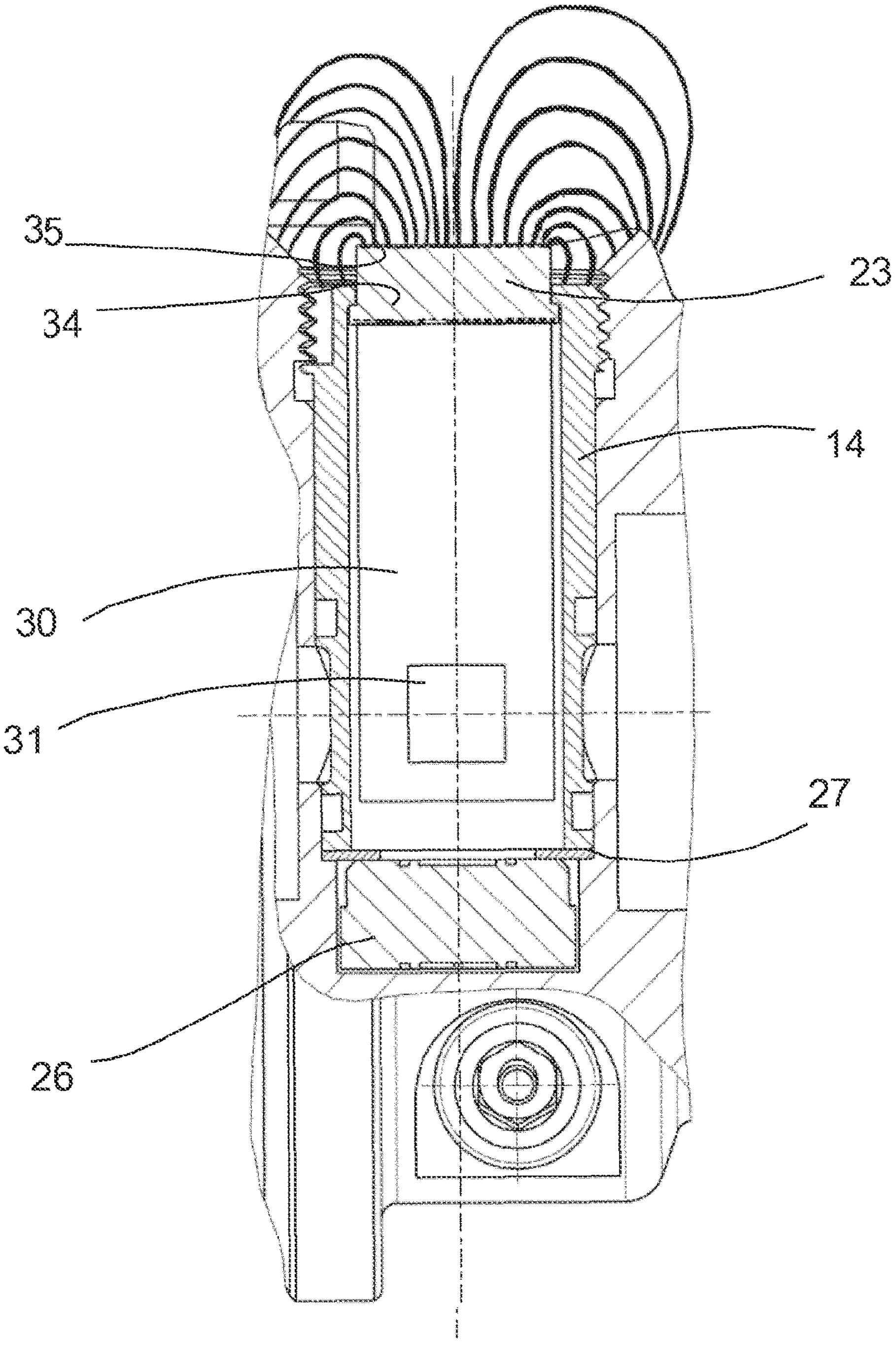
Figure 6:
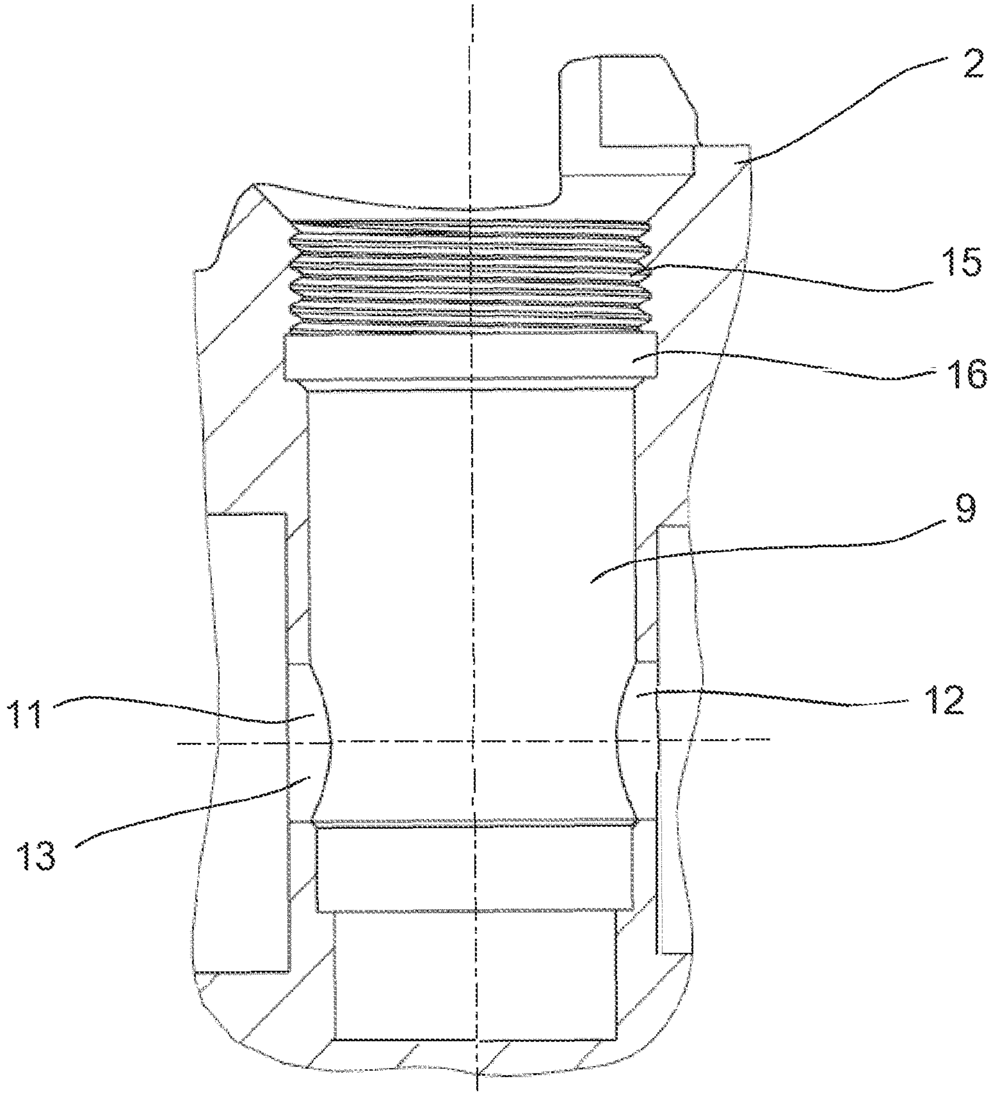
FIG. 6 a detailed sectional view of the base body of the clamping device from FIG. 1.
Figure 10:
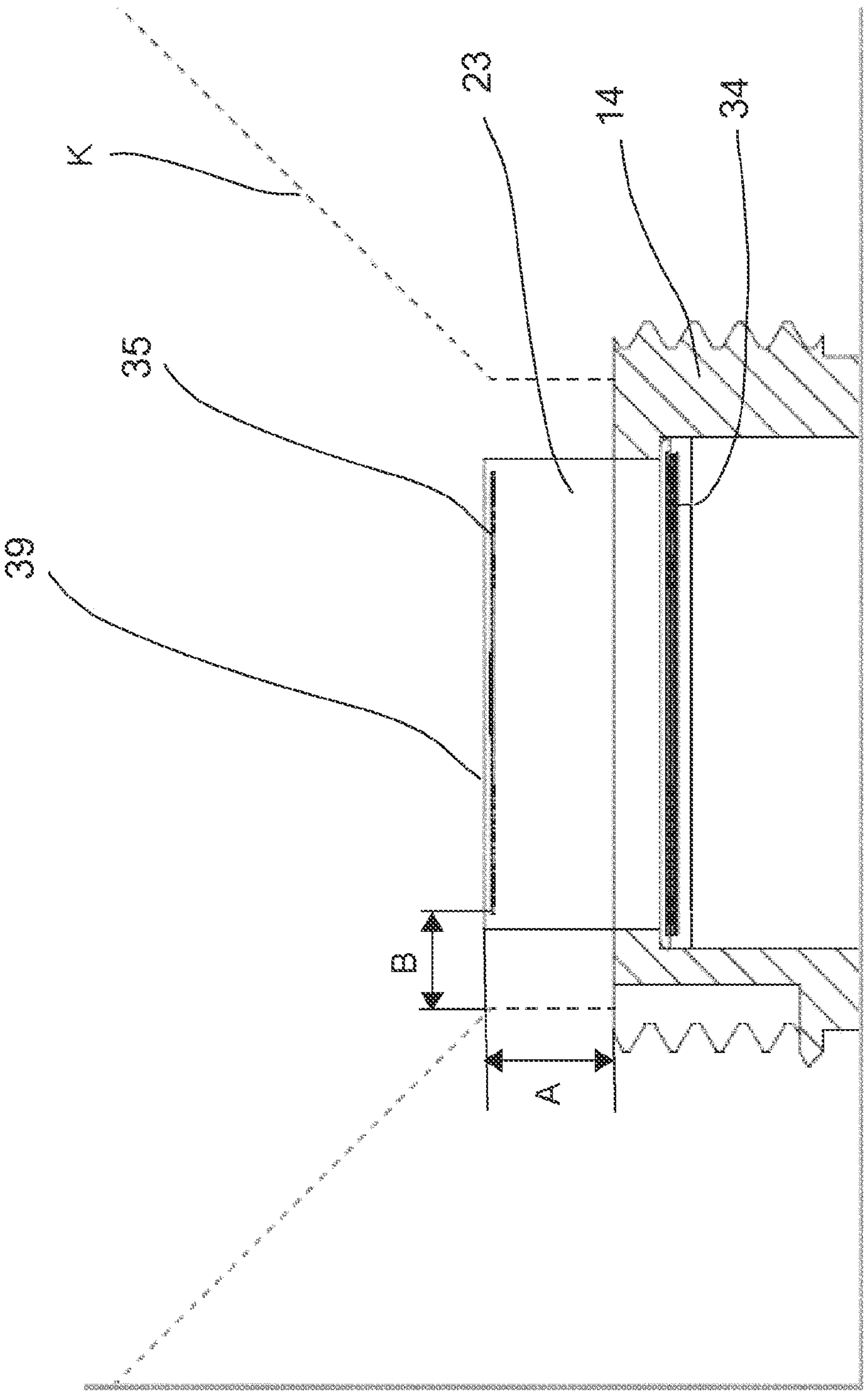
FIG. 10 a detailed sectional view of the end area of the sensor module on the cover side shown in FIG. 7.

The field lines of the antenna 33, which are created by a potential difference applied between the earth pole 34 and the antenna pole 35, are shown schematically in FIGS. 3 and 5, for example. For a favorable transmission of signals, it is necessary that no metallic objects are arranged in certain areas in the environment around the clamping device 1 or around the sensor module 10. These installation space limits with the basic shape of a cone K are shown in FIG. 10 by the dashed lines, between which, i.e. in the central area of FIG. 10, no metallic components should be arranged. A certain distance B should be maintained radially to the sensor axis from the antenna pole 35. This should be greater than the dimension A at which the antenna pole 35 is spaced from the end face of the sensor housing 14 on the shutter cover side. The dimension A is preferably at least 30% of the diameter of the antenna pole 35. The opening angle $\alpha$ of the cone should be at least 10°, preferably at least 20°.

If the sensor module 10 according to the invention is to be replaced, it can be easily unscrewed from the receiving chamber 9. An appropriate tool is used for this purpose, which is engaged in the recesses 18. After removing the sensor module 10, the shim 27 and the energy supply unit 26 can be easily removed from the receiving space.

The clamping device 1 can be reassembled in the same way by inserting the energy supply unit 36 into the closed end of the receiving space 9. The shim 27 is then inserted before the sensor module 10 is screwed into the mounting space 9. The sensor module 10, which is designed as an assembly unit, can be replaced quickly and easily. At the same time, the energy supply device 32 can be easily charged via the cover 26. In addition, the data is transmitted via the data transmission device 32, which is housed in the sealing cover 26, with little susceptibility to interference. The sensitive components such as the sensor element 31 or the power supply unit are protected inside the housing 9 and inside the sensor housing 14.

Figure 12:
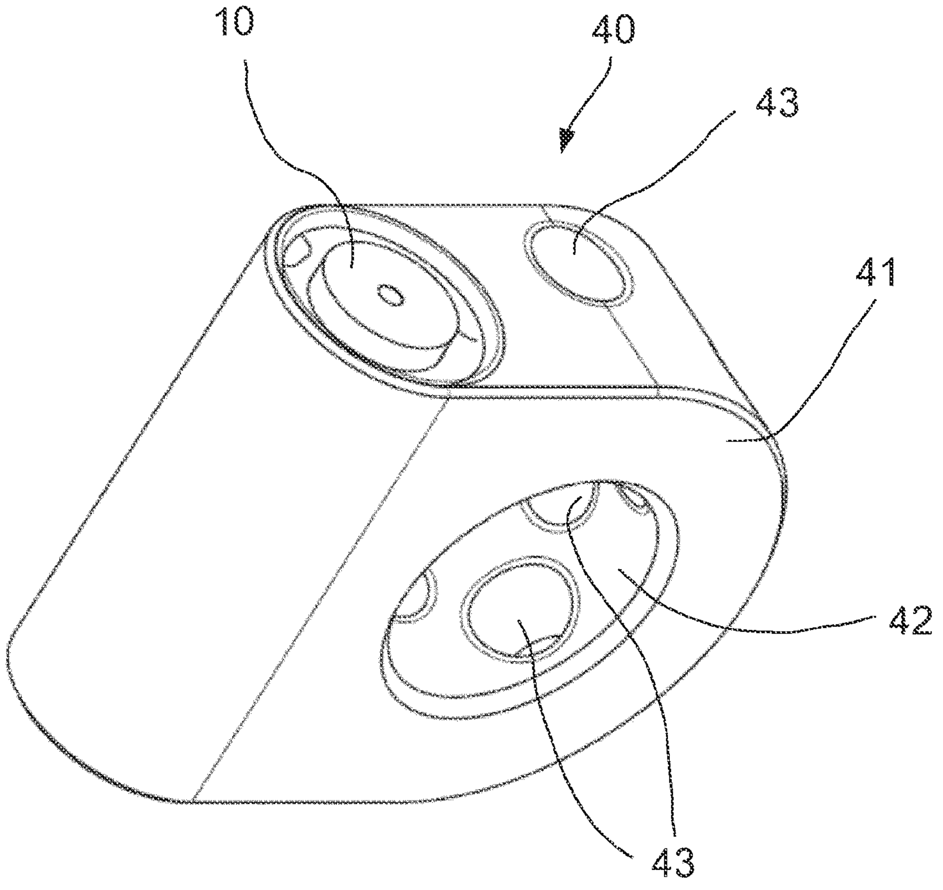
FIG. 12 a perspective view of a sensor arrangement according to the present invention.
Figure 13:
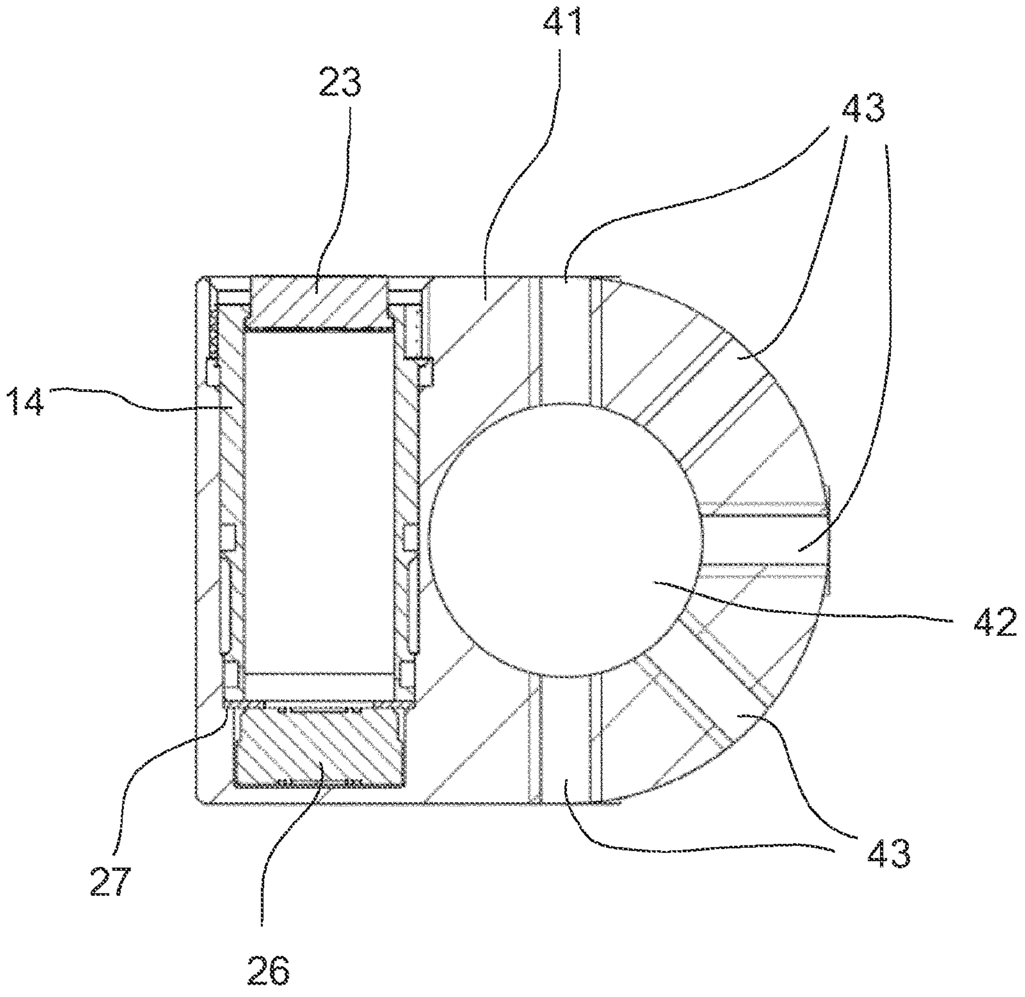
FIG. 13 a sectional view of the sensor arrangement from FIG. 11.

FIGS. 12 and 13 show an embodiment of a sensor arrangement according to the invention. This comprises a base body 40, in which a receiving space 9 for a sensor module 10 is formed. This receiving space 9 is open to an outer side of the base body 40, and a sensor module 10 as described above is screwed into the receiving space 9. As with the previously described clamping device 1, the sensor arrangement 40 also comprises an energy supply unit 26, which is arranged at the inner end of the receiving space 9. A shim 27 is arranged between the energy supply unit 26 and the sensor module 10.

The sensor arrangement 40 also comprises fastening means for attaching it to a component. Specifically, these fastening means comprise a receiving opening 42, by means of which the base body 41 can be pushed onto a component. A plurality of threaded through-holes 43 are formed radially to the receiving opening 42, by means of which the base body 41 can be clamped to a component using clamping screws.

The sensor arrangement 40 according to the invention makes it possible to subsequently attach a sensor module 10 to a component, for example to a turning tool, in order to be able to reliably detect, in particular, vibrations which occur and which can be associated with increasing tool wear. In the same way as with the clamping device described above, the measurement data recorded by the sensor element 31 is processed by suitable data processing means on the circuit board 30 and transmitted externally to a receiver by means of the data transmission device 32.

The invention claimed is:

1. A clamping device (1) for clamping a component, in particular for fixing a tool on a machine tool, with:

a base body (2) defining a clamping axis (X), at the front end region of which is arranged a clamping region (3) for a component to be clamped, in particular for a tool shank, wherein a receiving space (9) for a sensor module (10) is formed in the base body (2), which is open to a peripheral surface of the base body (2) and extends radially into the base body (2) starting therefrom, and a sensor module (10) which is designed as a structural unit and comprises a tubular sensor housing (14), which defines a sensor axis (Y), a closure cover (23), which firmly closes the sensor housing (14) at one end face, a sensor element (31) accommodated within the sensor housing (14) for detecting operating parameters and a data transmission device (32) connected to the sensor element (31) for the wireless transmission of measurement data recorded by the sensor element (31) to a receiver located outside the clamping device (1), wherein the sensor module (10) is inserted into the receiving space (9) and held therein in such a way that the closure cover (23) faces outwards.

2. The clamping device (1) according to claim 1, wherein the data transmission device (32) is integrated in the closure cover (23), and wherein the data transmission device (32) comprises an antenna (33), in particular cast into the closure cover, with an earth pole (34) and an antenna pole (35).

3. The clamping device (1) according to claim 2, wherein the earth pole (34) is connected or can be connected to the sensor housing (14) in an electrically conductive manner, and/or wherein the earth pole (34) and the antenna pole (35) are designed in the form of a disc, in particular with a circular outer shape in the closure cover (23), the two poles (34, 35) extending in particular parallel to one another perpendicular to the sensor axis (Y), wherein the antenna pole (35) is arranged adjacent to the outwardly facing end face of the closure cover (23) and the earth pole (34) is located on the inside of the antenna pole (35) in the closure cover (23), in particular in the region of an annularly circumferential outer collar (25) of the closure cover, wherein the antenna pole is connected to an electrical conductor which, starting from the antenna pole, leads into the interior of the sensor housing, in particular to a circuit board, and the earth pole has a through-hole through which the electrical conductor runs electrically insulated from the earth pole, and wherein, in particular, honeycomb-shaped openings (36) are formed in the antenna pole (35) and/or the earth pole (34), and the honeycomb-shaped openings (36) are filled with material, in particular with a plastic.

4. The clamping device (1) according to claim 1, wherein it further comprises a power supply unit (26) for supplying the sensor module (10) with power.

5. The clamping device (1) according to claim 4, wherein the energy supply unit (26) is accommodated as a separate component in the receiving space (9), wherein, in particular, the energy supply unit (26) is arranged at the inner end of the receiving space (9) and a shim (27) is arranged between the energy supply unit (26) and the sensor module (10) in order to position the sensor element (31) on the clamping axis (X), and wherein the sensor module (10) has two externally accessible electrical charging contacts (28, 29), which are each electrically connected or connectable to corresponding contacts on the energy supply unit (26) and are electrically insulated from one another in order to be able to supply the energy supply unit (26) with voltage and/or current and charge it by contacting the two electrical charging contacts (28, 29) with the poles of a charging device.

6. The clamping device (1) according to claim 5, wherein a first electrical charging contact (28), in particular for applying a negative pole of a charger, is arranged in the closure cover (23) centrally in the closure cover (23), and a second electrical charging contact (29) for applying a positive pole of a charger is formed by the externally accessible end face of the sensor housing (14).

7. The clamping device (1) according to claim 6, wherein the first electrical charging contact (28) is electrically conductively connected to the antenna pole (35), in particular is formed by a contact region (39) formed on the antenna pole (35), which is open to the outside.

8. The clamping device (1) according to claim 1, wherein the receiving space (9) intersects the clamping axis (X), but does not completely penetrate the base body (2) radially, and/or wherein the sensor element (31) is arranged inside the sensor housing (14) in such a way that it lies on the clamping axis (X), and/or wherein the sensor module (10) has a circuit board (30) which is arranged inside the sensor housing (14) and carries the sensor element (31), the circuit board (30) running parallel to the sensor axis (Y) and containing data processing means for processing the measurement signals provided by the sensor element (31), and/or wherein the base body (2) has at least one coolant channel (11) for conducting coolant from a rear machine interface of the base body (2) forwards to the clamping region (3), at least one coolant channel (11) intersecting the receiving space (9), so that the receiving space (9) divides the coolant channel (11) into a front channel section (12) and a rear channel section (13), and wherein an annular circumferential coolant groove (19) is formed in the outer circumferential surface of the sensor housing (14), so that coolant which is conducted to the clamping region (3) can flow past the sensor housing (14) from the rear channel section to the front channel section through the coolant groove (19).

9. The clamping device (1) according to claim 8, wherein sealing means are provided to seal the gap between the sensor housing (14) of the sensor module (10) and the wall of the receiving space (9) on both sides of the coolant groove (19), and wherein, in particular, on both sides next to the coolant groove (19) an annular circumferential sealing groove (20, 21) is formed in the sensor housing (14), into which sealing rings (22) are inserted and are pressed against the wall of the receiving space (9).

10. The clamping device (1) according to claim 1, wherein the sensor module (10) is screwed into the base body (2), an external thread (17) being formed on the sensor housing (14), which is screwed into a corresponding internal thread (15) of the receiving space (9), wherein engagement means for the tool are formed in the sensor housing (14) in order to be able to screw the sensor module (10) into the receiving space (9), and the engagement means comprise several, in particular three, recesses (18) distributed along the circumference and open outwards towards the closed end face and radially to the sensor axis (Y), which recesses extend into the thread.

11. The clamping device (1) according to claim 1, wherein a radially inwardly projecting annular collar (24) is provided at the closed end region of the sensor housing (14), which collar engages behind a corresponding annularly circumferential outer collar (25) of the closure cover (23), so that the closure cover (23) is held positively on the sensor housing (14), and/or wherein the receiving space (9) has a circular cross-section, the diameter of the receiving space (9) being larger than the diameter of the at least one coolant channel (11).

12. A sensor module (10), in particular for a clamping device (1) according claim 1, wherein the sensor module (10) is designed as a structural unit and comprises a tubular sensor housing (14) which defines a sensor axis (Y), a closure cover (23), which firmly closes the sensor housing (14) at one end, a sensor element (31) accommodated within the sensor housing (14) for recording measurement data, and a data transmission device (32) connected to the sensor element (31) for the wireless transmission of measurement data recorded by the sensor element (31) to a receiver located outside the clamping device (1), wherein the data transmission device (32) is integrated into the closure cover (23), and/or wherein the sensor module (10) has two externally accessible electrical charging contacts (28, 29) which can each be electrically connected to corresponding contacts of a power supply unit (26) and are at the same time electrically insulated from one another, in order to be able to supply the power supply unit (26) with voltage and/or current and charge it by contacting the electrical charging contacts (28, 29) with a charger in order to be able to supply the power supply unit (26) with voltage and/or current and charge it, a first electrical charging contact (28) being arranged in the closure cover (23), centrally in the closure cover (23), in particular for applying a negative pole of a charger, and a second electrical charging contact (29), in particular for applying a positive pole of a charger, being formed by the end face of the sensor housing (14) on the closure cover side.

13. The sensor module (10) according to claim 12, wherein the data transmission device (32) comprises an antenna (33) integrated in the closure cover (23), in particular cast into the latter, with an earth pole (34) and an antenna pole (35), wherein the earth pole (34) is connected or can be connected to the sensor housing (14) in an electrically conductive manner, and wherein the earth pole (34) and the antenna pole (35) are formed in the form of a disc, in particular with a circular outer shape in the closure cover (23), the two poles (34, 35) extending in particular parallel to one another perpendicular to the sensor axis (Y).

14. The sensor module (10) according to claim 13, wherein the antenna pole (35) is arranged adjacent to the outwardly facing end face of the closure cover (23) and the earth pole (34) is located on the inside of the antenna pole (35) in the closure cover (23), in particular in the region of an annularly circumferential outer collar (25) of the closure cover (23), wherein the antenna pole (35) is connected to an electrical conductor (37) which, starting from the antenna pole (35), leads into the interior of the sensor housing (14), and the earth pole (34) has a through-hole (38) through which the electrical conductor (37) runs electrically insulated from the earth pole (34), and/or wherein the antenna pole (35) and/or the earth pole (34) are formed with honeycomb-shaped openings (36), and the honeycomb-shaped openings (36) are filled with material, in particular with a plastic.

15. The sensor module (10) according to claim 12, wherein the sensor element (31) is arranged within the sensor housing (14) in such a way that it can be placed on the clamping axis (X) of a clamping device (1), and/or wherein the sensor module (10) comprises a circuit board (30) which is arranged within the sensor housing (14) and carries the sensor element (31), the circuit board (30) extending through the sensor axis (Y) and including data processing means for processing the measurement signals provided by the sensor element (31), and/or wherein an annular circumferential coolant groove (19) is formed in the outer circumferential surface of the sensor housing (14), wherein an annular circumferential sealing groove (20, 21) is formed on both sides of the coolant groove (19), into which sealing rings (22) can be inserted.

16. The sensor module (10) according to claim 12, wherein an external thread (17) is formed on the sensor housing (14), and/or wherein engagement means for a tool are formed in the sensor housing (14) in order to be able to screw the sensor module (10) into a receiving space (9) of a clamping device (1), and wherein, in particular, the engagement means comprise several, in particular three, recesses (18) distributed along the circumference and open towards the closed end face and radially outwards to the longitudinal axis, which recesses extend into the external thread (17).

17. Sensor The sensor module (10) according to claim 12, wherein a radially inwardly projecting annular collar (24) is provided on the sensor housing (14), which collar engages behind a corresponding outer collar (25) of the closure cover (23), so that the closure cover (23) is held positively on the sensor housing (14).

18. Sensor A sensor arrangement (40) for mounting on a component, in particular on a tool holder or on a tool, including a turning tool, with;

a base body (41), which has fastening means for attachment to a component and in which a receiving space (9) for a sensor module (10) is formed, which is open to an outer side of the base body (41), and a sensor module (10) according to one of claims 12 to 17, which is inserted, in particular screwed, into the receiving space (9).

19. The sensor arrangement (40) according to claim 18, further comprising a power supply unit (26) for supplying the sensor module (10) with power, wherein the power supply unit (26) is in particular accommodated in the receiving space (9), and arranged at an inner end of the receiving space (9).

20. The sensor arrangement (40) according to claim 18, wherein the fastening means comprise a receiving opening (42) for mounting on a component.

* * * * *